United States Patent [19]
Gunnink

[11] Patent Number: 5,957,217
[45] Date of Patent: Sep. 28, 1999

[54] STRIP TILLAGE APPARATUS

[76] Inventor: Darrel W Gunnink, 7148 S. Summerville Rd., Clinton, Wis. 53525

[21] Appl. No.: 09/055,736

[22] Filed: Apr. 6, 1998

[51] Int. Cl.⁶ .................................................. A01B 49/02
[52] U.S. Cl. ......................... 172/166; 172/184; 172/195; 172/265; 172/574; 172/657; 172/661; 172/686; 172/696; 172/701
[58] Field of Search .................................. 111/151, 165, 111/168, 169; 172/701, 166, 184, 188, 264, 265, 31, 29, 556, 574, 568, 583, 600, 603, 657, 661, 686, 696, 195

[56] References Cited

U.S. PATENT DOCUMENTS

| | | | |
|---|---|---|---|
| 1,642,908 | 9/1927 | Taylor | 111/165 X |
| 3,023,717 | 3/1962 | Cline | 172/701 X |
| 4,073,245 | 2/1978 | Anderson | 172/701 X |
| 4,333,534 | 6/1982 | Swanson et al. | 111/135 X |
| 4,519,325 | 5/1985 | Miller | 111/164 |
| 4,519,460 | 5/1985 | Gust | 111/136 X |
| 4,524,837 | 6/1985 | Harden | 172/156 |
| 4,682,658 | 7/1987 | Erickson | 172/701 X |
| 4,819,737 | 4/1989 | Frase | 172/166 X |
| 5,074,227 | 12/1991 | Schwitters | 111/137 |
| 5,333,694 | 8/1994 | Roggenbuck et al. | 172/156 |
| 5,339,906 | 8/1994 | Fox et al. | 172/4 |
| 5,473,999 | 12/1995 | Rawson et al. | 111/165 X |
| 5,499,685 | 3/1996 | Downing, Jr. | 172/699 |
| 5,623,997 | 4/1997 | Rawson et al. | 172/156 |
| 5,782,307 | 7/1998 | Forsyth | 172/166 X |

FOREIGN PATENT DOCUMENTS

| | | | |
|---|---|---|---|
| 2396498 | 3/1979 | France | 111/165 |
| 132325 | 9/1919 | United Kingdom | 111/165 |

*Primary Examiner*—Christopher J. Novosad
*Attorney, Agent, or Firm*—Quarles & Brady LLP

[57] ABSTRACT

The present invention provides a shankless strip tillage tool for no-till preparation of surface soil for the planting of seeds. The strip tillage apparatus has a frame for mounting the apparatus to a tool bar mounted on a draft vehicle. The frame has a pivotally mounted tandem walking beam with a pair of angled coulters rotatably mounted on the walking beam for displacing soil. The angled coulters displace soil as they are pulled through the soil by the draft vehicle and urges the soil toward the center of the strip to accomplish the no-till preparation.

9 Claims, 2 Drawing Sheets

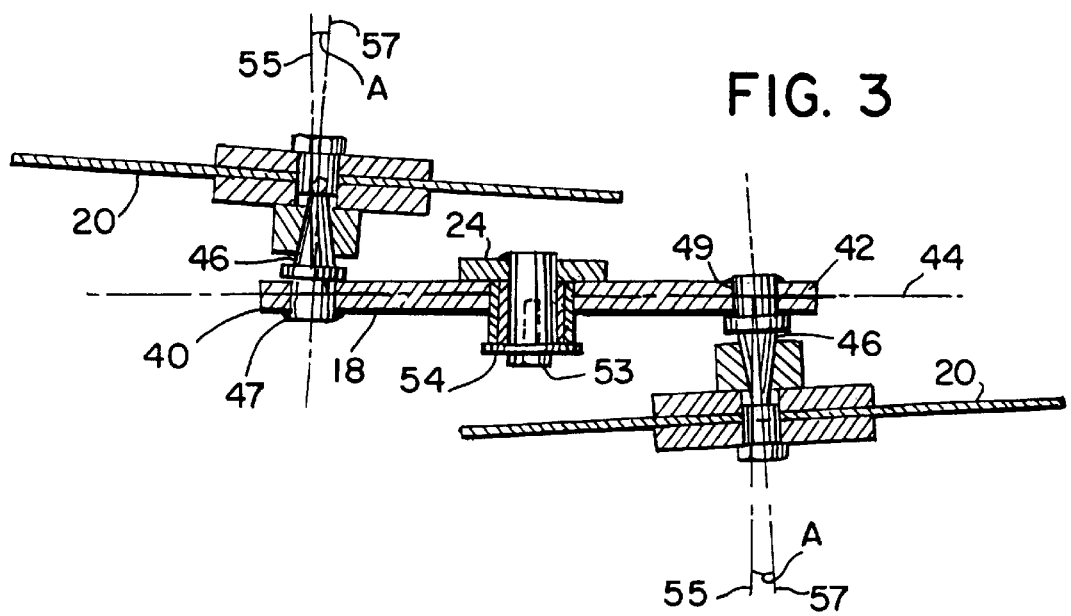
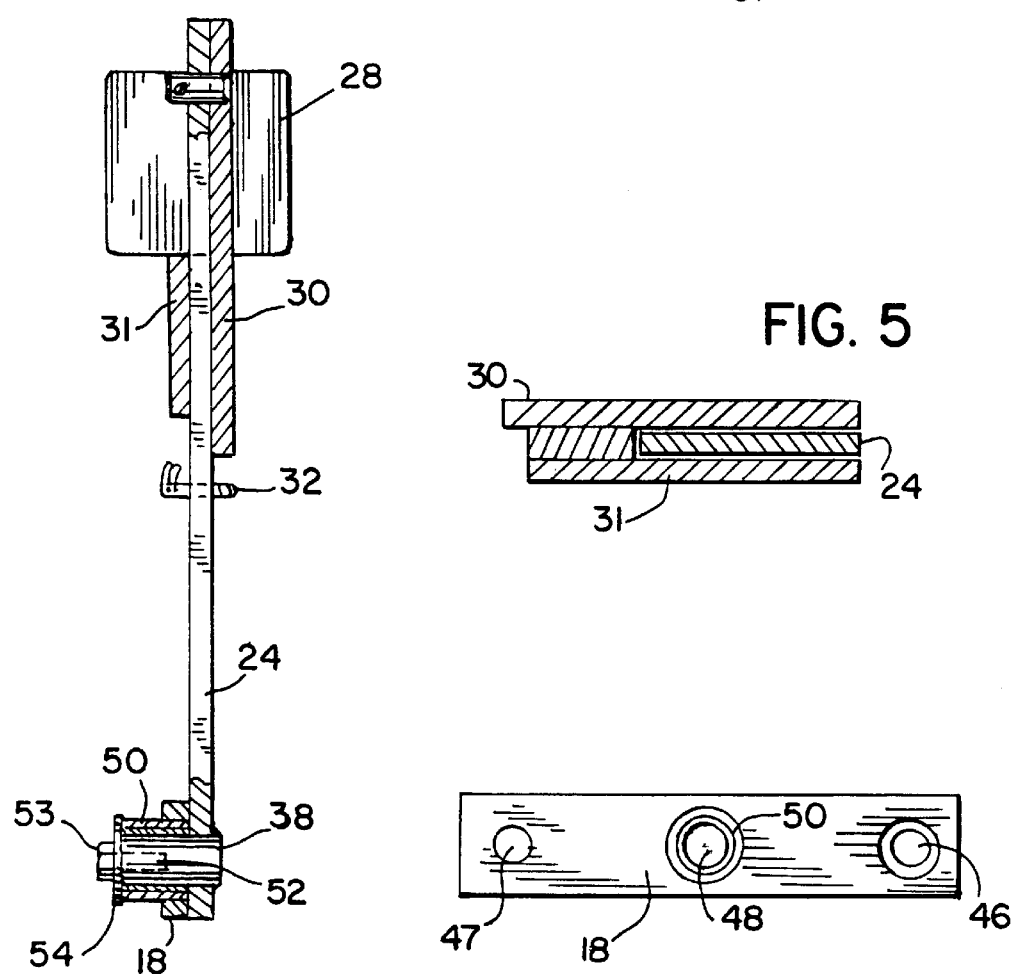

STRIP TILLAGE APPARATUS

CROSS REFERENCES TO RELATED APPLICATIONS

Not Applicable

STATEMENT REGARDING FEDERALLY SPONSORED RESEARCH

Not Applicable

BACKGROUND OF THE INVENTION

The field of invention is strip tillage tools, more particularly shankless no-till strip tillage tools for seed bed preparation.

Soil erosion caused by conventional farming methods, such as mold board plowing followed by secondary tillage operations causes significant problems for modern farmers. Conventional farming methods disturb residue left from a previous crop that protects the field from rainfall, especially on sloping lands. Soil washed away by the rainfall results in a loss of valuable topsoil and a corresponding lower crop yield.

In order to reduce soil erosion, conservation tillage farming methods have been introduced. One particularly effective conservation tillage method is "no-till" seed preparation. Tillage, and the resulting erosion, is essentially eliminated with a no-till system. In a no-till system, the crop seed is placed in a narrow strip opened by a no-till strip tillage tool.

A no-till strip tillage tool loosens soil along a narrow strip without creating a trench or disturbing adjacent prior crop residue. The adjacent crop residue provides erosion control and the loosened strip of soil provides a bed for the crop seed.

Known strip tillage tools disclosed in U.S. Pat. No. 4,524,837, Harden, U.S. Pat. No. 4,333,694, Roggerbuck et al, and U.S. Pat. No. 5,623,997, Rawson et al have a shank that displaces soil as the tool is pulled by a draft vehicle. A slot filler mounted slightly rearwardly and adjacent to the shank is necessary to fill the furrow created by the shank to provide a no-till strip. The slot filler and shank are pulled through the soil creating significant drag reducing fuel efficiency of the draft vehicle.

Furthermore, conventional no-till strip tillage tools having shanks tend to leave a trench when pulled at normal tiling speeds of 6–8 miles per hour. To avoid trenching, the draft vehicle must travel at lower speeds than is desired causing the no-till method to take longer to prepare a field for planting than other methods. The present invention is directed to overcoming one or more of the above.

BRIEF SUMMARY OF THE INVENTION

The present invention provides a strip tillage apparatus for no-till preparation of surface soil for the planting of seeds. The strip tillage apparatus has a frame for mounting the apparatus to a tool bar mounted on a draft vehicle. The frame has a pivotally mounted tandem walking beam with a pair of angled coulters rotably mounted on the walking beam for displacing soil. The angled coulters displace soil as they are pulled through the soil by the draft vehicle and urges the soil toward the center of the strip to accomplish the no-till preparation. Thus accomplishing a general objective to provide a shankless strip tillage apparatus for no-till soil preparation.

Another objective of the present invention is to provide a strip tillage apparatus capable of absorbing shocks resulting from the coulters striking objects embedded in the soil. This objective is accomplished by providing a strip tillage apparatus frame with pivotally mounted vertical member and a spring for absorbing shocks.

Still another objective of the present invention is to provide a strip tillage apparatus capable of negotiating objects embedded in the soil as the apparatus is pulled by the draft vehicle. This objective is accomplished by mounting the coulters on a pivotally mounted tandem walking beam to allow the coulters to pivot upwardly as the coulter strikes an object in its path.

The foregoing and other objects and advantages of the invention will appear from the following description. In the description, reference is made to the accompanying drawings which form a part hereof, and in which there is shown by way of illustration a preferred embodiment of the invention.

BRIEF DESCRIPTION OF THE DRAWINGS

FIG. 3 is a top view of the tandem walking beam of the tillage tool shown in FIG. 1;

FIG. 4 is a section view along line 4—4 of the vertical frame member in FIG. 2;

FIG. 5 is a section view along line 5—5 of the vertical frame member and cradle in FIG. 2; and FIG. 6 is a elevational view of the tandem walking beam in FIG. 3.

DETAILED DESCRIPTION OF THE PREFERRED EMBODIMENTS

Figure 1:
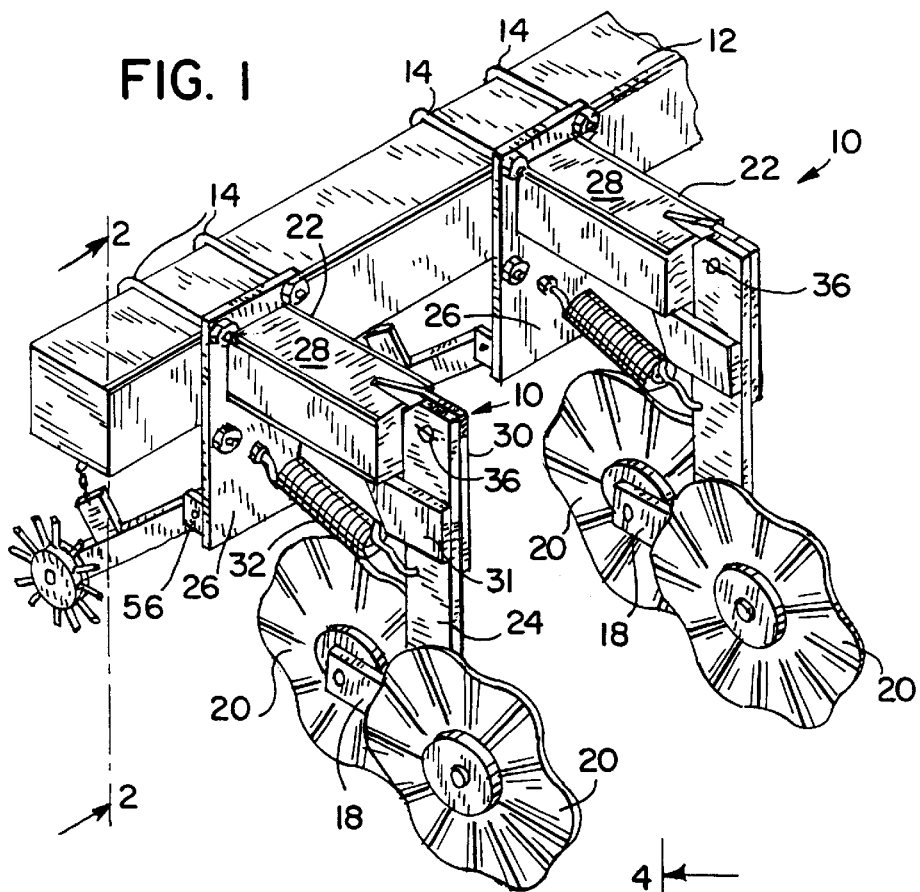
FIG. 1 is a perspective view of a pair of no-till strip tillage tools mounted on a tool bar incorporating the present invention.

An embodiment of the invention as shown in FIG. 1 is a strip tillage tool, generally 10, for no-till preparation of surface soil for the planting of seeds. The tool 10 is conventionally mounted to a tool bar 12 which is coupled to a draft vehicle (not shown), such as a conventional farm tractor for use in a farm field. The invention contemplates that a plurality of substantially identical tillage tools 10 are mounted to an elongated, tubular tool bar 12, allowing an operator to till multiple parallel rows in a single pass of the draft vehicle.

Figure 2:
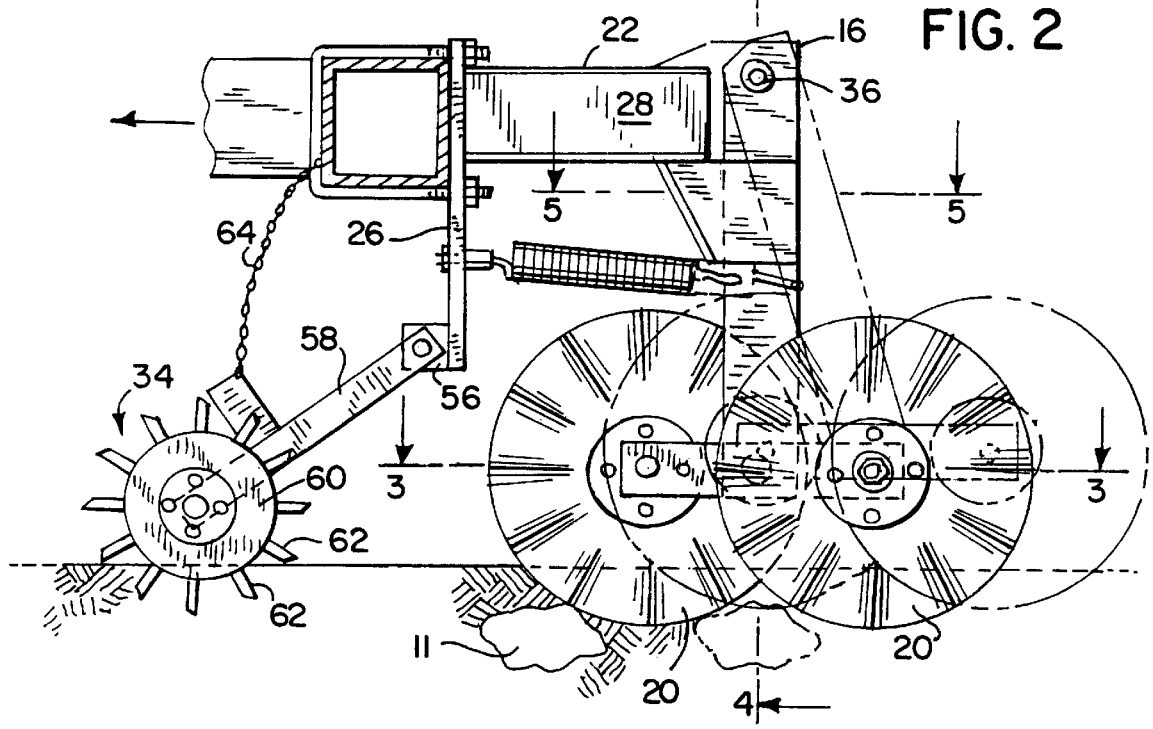
FIG. 2 is a side elevational view of the tillage tool shown in FIG. 1.

As shown in FIGS. 1 and 2, the strip tillage tool 10 has a frame 16 conventionally mounted to the tool bar 12 by U-bolts 14. A walking beam 18 with a pair of rotably mounted, staggered, angled coulters 20 is pivotally mounted to the frame 16. The angled coulters 20 penetrate the soil to create the no-till strip. Significantly, the present invention accomplishes the no-till strip without the use of a shank penetrating the soil, thus reducing the drag on the draft vehicle as the no-till operation is performed.

The strip tillage tool frame has a horizontal frame assembly 22 and a vertical frame member 24. The horizontal frame assembly 22 serves as a backbone for the strip tillage tool 10 and has an attachment plate 26 rigidly mounted to one end of an elongated box beam 28 and a cradle 30 rigidly mounted to the other end of the beam 28.

The attachment plate 26 is preferably ¾ inch steel plate mounted to the front end of the box beam 28 by welding or other methods known in the art. The metal plate 26 is rigidly mounted to the tool bar 12 by U-bolts 14 and extends downwardly providing attachment points for a shock absorbing spring 32 and a trash whipper 34.

The square box beam 28 is preferably 13 inches long having 5 inch sides and longitudinally extends rearwardly from the attachment plate 26 away from the tool bar 12 providing a cantilevered support for the vertical frame member 24. Although a box beam is shown and described, any rigid structural member may be used such as an I-beam or tube steel.

The cradle 30 is a weldment rigidly mounted at the distal end of the box beam 28. A shaft 36 for pivotally mounting the vertical frame member 24 is rigidly mounted to the cradle 30. As shown in FIG. 5, a rearwardly depending bracket 31 mounted on the cradle 30 prevents forwardly and excess lateral movement of the vertical frame member 24 as it pivots about the shaft 36.

The vertical frame member 24 is preferably a ¾ inch steel plate that is pivotally mounted on the cradle shaft 36 by conventional means known in the art such as a cotter pin. A spring 32 for absorbing shocks that occur when the tool 10 strikes a rock or other object 11 in its path is attached to the vertical frame member 24 at one end of the spring 32 and the attachment plate 26 at the other end. The spring 32 allows the vertical frame member 24 to pivot rearwardly, as shown by phantom lines in FIG. 2, when the coulters 20 strike an object 11, while continuously urging the vertical frame member 24 forwardly into the bracket 31.

Referring to FIGS. 3 and 4, a tandem walking beam 18 is pivotally mounted on a lower shaft 38 mounted at the bottom end of the vertical frame member 24 to minimize shocks from striking debris by pivoting over the debris. As shown in FIG. 6, the beam 18 has a centrally located aperture 48 for receiving the lower shaft 38. Preferably, a bronze bushing 50 with a grease groove is mounted in the aperture 48.

As shown in FIGS. 3 and 4, the beam 18 is pivotally mounted to the vertical member 24 by slipping the vertical member shaft 38 into the bushing 50. The shaft 38 has a threaded longitudinal bore 52 for receiving a threaded bolt 53 inserted through an opening (not shown) in a circular cap 54. The cap 54 has a diameter larger than the beam aperture 48 retaining the beam 18 on the shaft 38.

Referring specifically to FIG. 3, the generally rectangular walking beam 18 is preferably a ¾ inch steel plate having a front end 40, a rear end 42, and a central plane 44. opposing coulter shafts 46 are rigidly mounted in openings 47, 49 at each end 40, 42 of the beam 18. Each opening 47, 49 has an axis 55 perpendicular to the beam central plane 44. The opposing coulter shafts 46 have axes 57 that form an angle A with the opening axes 55. Preferably angle A is 2 to 2.5 degrees rearwardly with respect to the opening axes 55 in order to provide angled coulters 20 that displace the soil without leaving a trench at draft vehicle speeds of 6–8 miles per hour. Preferably, the coulter shafts 46 are spaced 12 inches apart to allow the coulters 20 to cooperatively displace soil.

Each coulter 20 is a disc approximately 18 inches in diameter rotably mounted on an angled coulter shaft 46. The coulters 20 penetrate the soil cooperatively displacing it as the tilling tool 10 is pulled by the draft vehicle. Most importantly, the angled coulter shafts 46 cause the coulters 20 to urge the soil displaced by the coulter action toward the center of the tilled strip, thus reducing the spread of displaced soil and causing undesirable erosion. Additionally, the 2 to 2.5 degree coulter angle resulting from the angled coulter shafts 46 allows the draft vehicle to travel at normal tilling speeds of 6–8 mph and still produce a no-till strip.

Looking back to FIG. 2, a trash whipper 34 for clearing a narrow strip path extends forward of the coulters 20 and is pivotally mounted to tabs 56 welded to the attachment plate 26. Preferably, the trash whipper 34 has one end of an arm 58 pivotally mounted to the tabs 56. The distal end of the arm 58 has a rotably mounted disc 60 having radially extending agitators 62 for clearing the strip path. A safety chain 64 having one end attached to the trash whipper arm 58 and the other end attached to the tool bar 12 prevents the trash whipper 34 from pivoting rearward of the tool bar 12 into the coulters 20 during use.

While there has been shown and described what are at present considered the preferred embodiment of the invention, it will be obvious to those skilled in the art that various changes and modifications can be made therein without departing from the scope of the invention defined by the appended claims.

I claim:

1. A shankless strip tillage tool for no-till preparation of surface soil for planting of seeds, said tool for use with a draft vehicle having a tool bar, said tool comprising:

a frame rigidly mounted to said tool bar;

a beam having a central axis, central portion, a front portion, and a rear portion, said central portion being pivotally mounted to said frame; and a pair of coulters rotably mounted to said beam, one of said coulters mounted at said front portion of said beam, the other of said coulters mounted at said rear portion of said beam, each of said coulters being angled rearwardly relative to an axis perpendicular to said central plane, wherein soil displaced by each of said coulters forms a tilled strip adjacent a strip of undisturbed crop residue.

2. The shankless strip tillage tool as in claim 1, wherein said coulters are angled rearwardly no less than 2 degrees and no greater than 2.5 degrees, relative to said respective axes.

3. The shankless strip tillage tool as in claim 1, wherein said frame comprises:

a horizontal mounting structure having a front portion and a rear portion, said front portion being rigidly mounted to said tool bar;

a vertical member having a top portion and a bottom portion, said top portion being pivotally mounted to said rear portion of said horizontal mounting structure, wherein said beam is pivotally mounted to said bottom portion of said vertical member.

4. The shankless strip tillage tool as in claim 1, wherein said tool includes a trash whipper extending forwardly of said coulters.

5. A shankless strip tillage tool for no-till preparation of surface soil for planting of seeds, said tool for use with a draft vehicle having a tool bar, said tool comprising:

a frame rigidly mounted to said tool bar, said frame having a horizontal mounting structure having a front portion and a rear portion, said front portion being rigidly mounted to said tool bar, and a vertical member having a top portion and a bottom portion, said top portion being pivotally mounted to said rear portion of said horizontal mounting structure, wherein said beam is pivotally mounted to said bottom portion of said vertical member, wherein said horizontal mounting structure has a vertical plate at said front portion, said vertical plate is rigidly mounted to said tool bar, a first end of a spring is attached to said plate, a second end of said spring is attached to said vertical member;

a beam having a central axis, central portion, a front portion, and a rear portion, said central portion being pivotally mounted to said frame; and a pair of coulters rotably mounted to said beam, one of said coulters mounted at said front portion of said beam, the other of said coulters mounted at said rear portion of said beam, each of said coulters being angled rearwardly relative to an axis perpendicular to said central plane, wherein soil displaced by each of said coulters forms a tilled strip adjacent a strip of undisturbed crop residue.

6. A shankless strip tillage tool for no-till preparation of surface soil for planting of seeds, said tool for use with a draft vehicle having a tool bar, said tool comprising:

a frame rigidly mounted to said tool bar, said frame having a horizontal mounting structure having a front portion and a rear portion, said front portion being rigidly mounted to said tool bar, and a vertical member having a top portion and a bottom portion, said top portion being pivotally mounted to said rear portion of said horizontal mounting structure, wherein said beam is pivotally mounted to said bottom portion of said vertical member, wherein said horizontal mounting structure has a cradle at said rear portion, wherein said cradle prevents forward pivotal movement of said vertical member forward of said cradle;

a beam having a central axis, central portion, a front portion, and a rear portion, said central portion being pivotally mounted to said frame; and a pair of coulters rotably mounted to said beam, one of said coulters mounted at said front portion of said beam, the other of said coulters mounted at said rear portion of said beam, each of said coulters being angled rearwardly relative to an axis perpendicular to said central plane wherein soil displaced by each of said coulters forms a tilled strip adjacent a strip of undisturbed crop residue.

7. A method of no-till preparation of surface soil for planting of seeds, said method comprising the steps of:

mounting a first shankless no-till strip tillage tool having rearwardly angled coulters to a draft vehicle;

engaging said angled coulters with soil;

urging said coulters through said soil to provide a tilled strip of soil adjacent an undisturbed strip of crop residue.

8. The method of no-till preparation of soil as in claim 7, wherein a second shankless no-till strip tillage tool having rearwardly angled coulters is mounted to said draft vehicle adjacent said first no-till strip tillage tool.

9. The method of no-till preparation of soil as in claim 7, wherein said coulters are urged through said soil at a speed no less than 6 miles per hour and no greater than 8 miles per hour while engaging said soil.

* * * * *